United States Patent
Saito et al.

(10) Patent No.: US 6,593,021 B1
(45) Date of Patent: Jul. 15, 2003

(54) FUEL CELL SEPARATOR AND FUEL CELL OF SOLID POLYMER TYPE

(75) Inventors: Kazuo Saito, Chiba (JP); Atsushi Hagiwara, Chiba (JP); Ayumi Horiuchi, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 77 days.

(21) Appl. No.: 09/692,106

(22) Filed: Oct. 20, 2000

(30) Foreign Application Priority Data

Oct. 20, 1999 (JP) .......................................... 11-298203

(51) Int. Cl.$^7$ ................................................ H01M 2/00
(52) U.S. Cl. ........................................... 429/34; 429/33
(58) Field of Search .............................. 429/33, 34, 46, 429/41, 253, 249; 264/105, 331.11

(56) References Cited

U.S. PATENT DOCUMENTS

| 4,301,222 A | * | 11/1981 | Emanuelson | 429/251 |
| 4,592,968 A | * | 6/1986 | Taylor | 429/34 |
| 4,737,421 A | * | 4/1988 | Uemura et al. | 429/34 |
| 6,242,124 B1 | * | 6/2001 | Saito et al. | 429/38 |

* cited by examiner

Primary Examiner—Stephen Kalafut
Assistant Examiner—R Alejandro
(74) Attorney, Agent, or Firm—Birch, Stewart, Kolasch & Birch, LLP

(57) ABSTRACT

Fuel cell separators having on one side or both sides thereof channels for gas supply and discharge, which channels are formed from compositions composed mainly of thermosetting resin and graphite particles. The compositions are designed to have a flexural modulus of at most 20 GPa and a flexural strength of at least 50 MPa (both measured according to JIS K6911). Also disclosed is a solid polymer type fuel cell system in which part or all of its separators are fuel cell separators as defined above. Due to its high strength and low flexural modulus, the fuel cell separators of the invention do not break as a result of deformation at the time of fuel cell assembly. Moreover, the fuel cell separators of the invention absorb shocks and vibration imparted to the fuel cell system. Therefore, they is useful for automobile fuel cells which are normally subject to vibrations and shocks during operation.

12 Claims, 4 Drawing Sheets

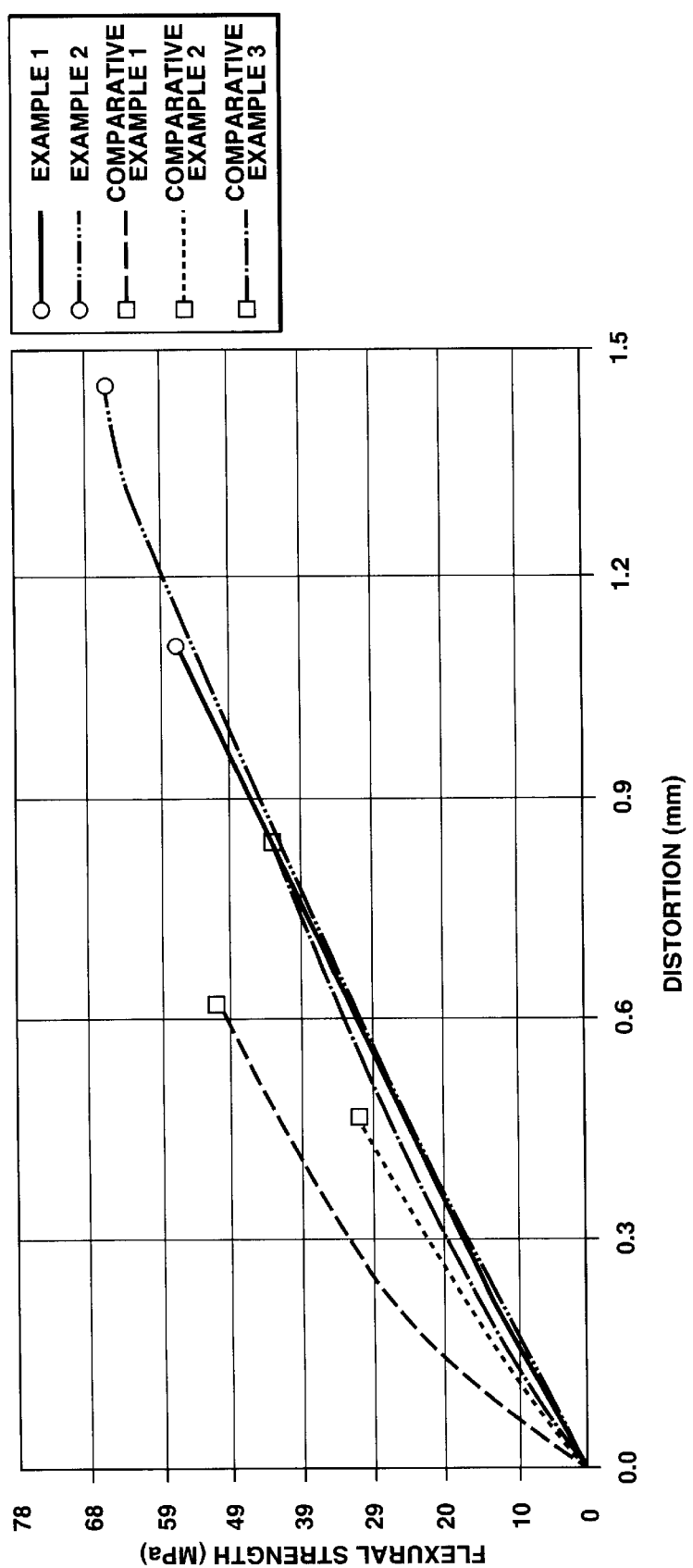

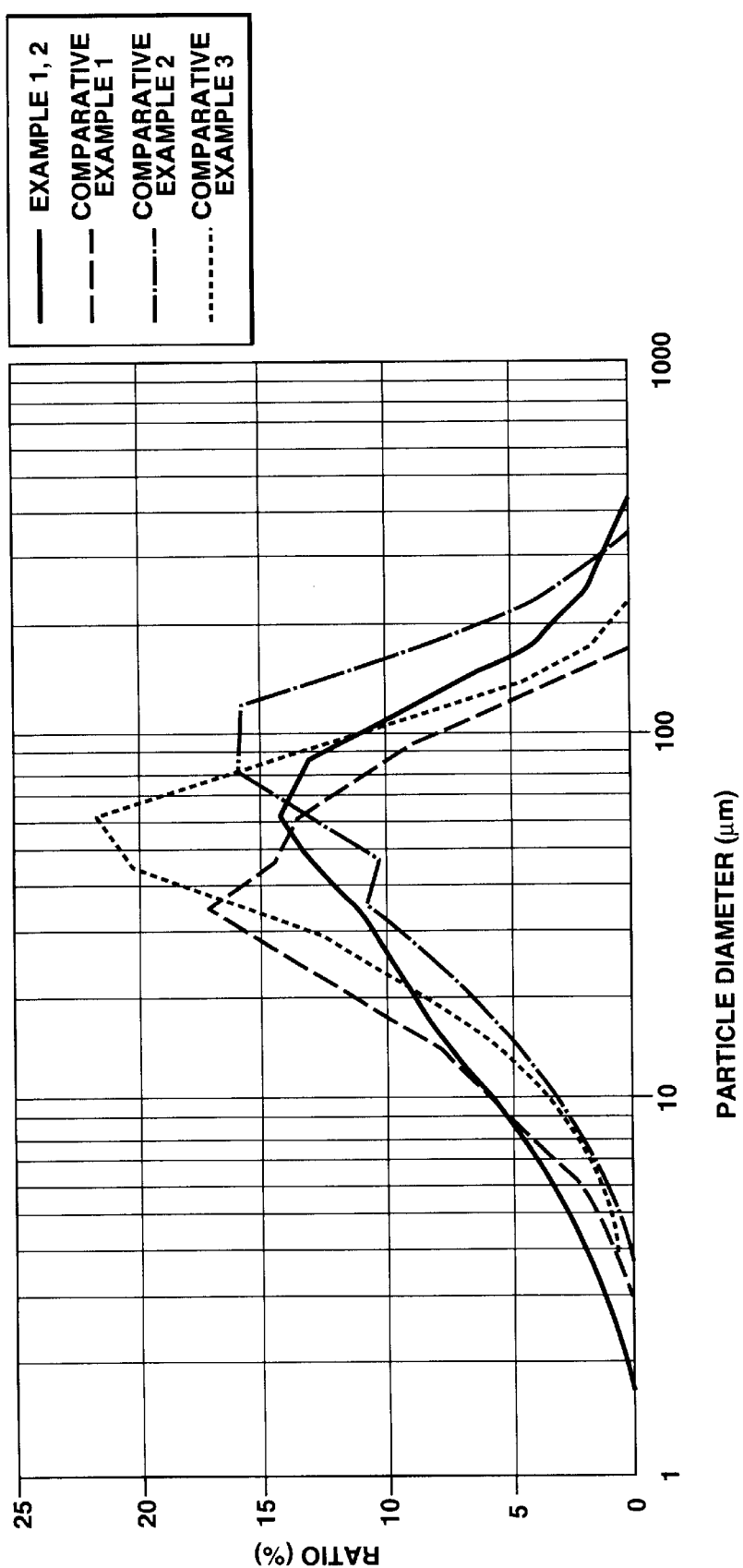

FUEL CELL SEPARATOR AND FUEL CELL OF SOLID POLYMER TYPE

BACKGROUND OF THE INVENTION

The present invention relates to a fuel cell separator having high strength and low modulus and being superior in flexibility. The present invention relates also to a fuel cell of solid polymer type having good vibration resistance and shock resistance. Said fuel cell separator is suitable for fuel cells as the mobile power source for automobiles, hybrid cars, and small ships. Said fuel cell of solid polymer type employs said fuel cell separator for all or part of its fuel cell separators.

A fuel cell generates electricity directly from fuel (such as hydrogen) and oxygen (in the atmosphere) supplied to it through electrochemical reactions to form water. It is capable of efficient energy conversion and free from environmental pollution. Thus it is finding new uses in various applications as small-scale local power source, domestic power source, simple power source at camp sites, mobile power source (for automobiles, hybrid cars, and small ships), and special power source (for artificial satellites and space development).

A fuel cell system, particularly that of solid polymer type, consists of tens or hundreds of unit cells which are stacked to form the battery module. As shown in FIG. 1, each unit cell is made up of one electrolytic membrane of solid polymer 2, two gas diffusion electrodes of carbon paper 3, 3, and two flat separators 1, 1, each having, on both sides thereof, ribs 1a which form channels 4 for gas (such as hydrogen and oxygen) to be supplied and discharged.

The fuel cell separator mentioned above is required to have high electrical conductivity, low gas permeability, and electrochemical stability so that it imparts electrical conductivity to individual unit cells and functions as channel for fuel and oxygen (air) and also as a separating membrane. Moreover, each unit cell is low in output voltage, which makes it necessary to stack tens or hundreds of unit cells in order to construct a fuel cell system with a practical capacity of the order of 100 kW. This has caused a demand for fuel cell separators having good thickness and surface accuracy and dimensional stability. This accuracy is necessary for good communication between the separator and the gas diffusion electrode.

The fuel cell separator has been made of metallic material (such as stainless steel and titanium) or carbonaceous material (such as vitreous carbon). However, none of them are satisfactory in performance and price.

There has recently been proposed a fuel cell separator formed from a carbonaceous material composed mainly of thermosetting resin and graphite particles. This fuel cell separator needs a large amount of graphite particles to impart an adequate level of conductivity. Graphite particles contribute to conductivity and strength but make the fuel cell separator less flexible. Fuel cell separators with low flexibility are liable to cracking when they are tightened during fuel cell assembling or when fuel cells receive shocks or vibration during their use as mobile power sources for automobiles, hybrid cars, or small ships.

SUMMARY OF THE INVENTION

The present invention was completed in view of the foregoing. Accordingly, it is an object of the present invention to provide a high-performance fuel cell separator and a fuel cell of solid polymer type. Said fuel cell separator is characterized by low modulus, high strength (which prevents damage during assembling), high electrical conductivity, high gas impermeability, high electrochemical stability, and high dimensional stability, which are required of fuel cell separators. Said fuel cell is partly or entirely provided with said fuel cell separator, and hence it is characterized by good vibration and shock resistance.

In order to achieve the above-mentioned object, the present inventors carried out extensive studies on relation between flexural strength and distortion in the fuel cell separator formed from a compound composed mainly of thermosetting resin and graphite particles. As the result, it was found that the fuel cell has good flexibility when it has high strength as well as low flexural modulus (which permits a large amount of bending).

FIG. 3 shows the relation between flexural strength and bending. Comparative Example 1 has a high flexural strength and a low bending, and Comparative Example 2 has a low flexural strength and a low bending. They have a considerably high flexural modulus which is a ratio of flexural stress to strain within the limit of elasticity of the material, which is shown as the slope of the graph in FIG. 3. Therefore, they are less flexible than Examples 1 and 2. This result suggests that the fuel cell separator should have a high flexural strength and a low flexural modulus (leading to a large bending) if it is to have good flexibility, high thickness accuracy, surface accuracy, and good vibration and shock resistance.

A fuel cell separator of conventional type is formed from a compound composed mainly of thermosetting resin and graphite particles. It decreases in conductivity and increases in strength as graphite decreases in average particle diameter, whereas it increases in conductivity and decreases in strength as graphite increases in average particle diameter. Both high conductivity and high strength are attained by incorporation with an adequate amount of graphite having a proper average particle diameter. The present inventors found that this conventional practice is not satisfactory for the fuel cell separator to have high flexural strength and low flexural modulus (that permits more bending). It was found that the object is effectively achieved not only by adjusting the amount of graphite and the average particle diameter of graphite but also by using graphite with a high ratio of coarse particles and a broad particle size distribution (difference between the maximum particle diameter and the minimum particle diameter).

In FIG. 4, Comparative Examples 1 to 3 show results in the case of graphite having a narrow particle size distribution (difference between the maximum particle diameter and the minimum particle diameter), particularly Comparative Examples 1 and 2 show results in the case of graphite of flaky particles. By contrast, Examples 1 and 2 show results in the case of graphite of needlelike particles having a broad particle size distribution (with a large maximum particle size and a high ratio of large particles). It is apparent from FIG. 3 that products in Comparative Examples 1 to 3 are inferior in flexural strength, flexural modulus, and distortion to those in Examples 1 and 2. This suggests that high flexural strength and low flexural modulus (increased amount of distortion) are effectively achieved if graphite has a large maximum particle diameter and a broad particle size distribution.

After their continued studies based on the above-mentioned finding, the present inventors found that it is possible to produce a satisfactory fuel cell separator (having on one side or both sides thereof grooves for gas supply and discharge) from a compound composed mainly of thermosetting resin and graphite particles only when the graphite particles (preferably needlelike graphite particles) have an average particle diameter of 20–100 μm and a maximum particle diameter of 240 to 550 μm and hence has a broad particle size distribution (difference between the maximum particle diameter and the minimum particle diameter). The resulting fuel cell separator has a flexural modulus of $M_1$ GPa and a flexural strength of $M_2$ MPa (both measured according to JIS K6911) which satisfy the following relations $$900 \leq M_1 \times M_2 \leq 2000$$

$$2 \leq M_2/M_1 \leq 10$$

and also has a flexural modulus equal to or equal to or lower than 20 GPa and a flexural strength equal to or higher than 50 MPa. The fuel cell separator superior in flexibility does not crack due to distortion at the time of assembling into a fuel cell, nor does it break when it receives strong vibrations and shocks because it absorbs them. If this fuel cell separator is used partly or entirely as the fuel cell separator of fuel cell of solid polymer type, the resulting fuel cell has good gas sealability and good shock and vibration resistance. Hence it is suitable for use as mobile electric sources for automobiles, hybrid cars, and small ships.

The present invention provides a fuel cell separator and a fuel cell of solid polymer type which are defined in the following.

(1) A fuel cell separator having on one side or both sides thereof channels for gas supply and discharge formed from a compound composed mainly of thermosetting resin and graphite particles, characterized in having a flexural modulus of $M_1$ GPa and a flexural strength of $M_2$ MPa (both measured according to JIS K6911) which satisfy the following relations.

$$900 \leq M_1 \times M_2 \leq 2000$$

$$2 \leq M_2/M_1 \leq 10$$

(2) A fuel cell separator having on one side or both sides thereof channels for gas supply and discharge formed from a compound composed mainly of thermosetting resin and graphite particles, characterized in having a flexural modulus equal to or lower than 20 GPa and a flexural strength equal to or higher than 50 MPa (both measured according to JIS K6911).

(3) A fuel cell separator having on one side or both sides thereof channels for gas supply and discharge formed from a compound composed mainly of thermosetting resin and graphite particles, characterized in that above-mentioned graphite particles have an average particle diameter of 20 to 100 μm and a maximum particle diameter of 240 to 500 μm.

(4) A fuel cell separator as defined in (3) above, wherein above-mentioned graphite particles have the following particle size distribution.

| Particle diameter (d) | Ratio |
|---|---|
| d < 10 μm | 5 to 20 wt % |
| 10 ≦ d < 50 μm | 15 to 75 wt % |
| 50 ≦ d < 100 μm | 15 to 60 wt % |
| 100 ≦ d < 200 μm | 5 to 25 wt % |
| d ≧ 200 μm | remainder |

(5) A fuel cell separator as defined in (3) or (4) above, wherein the graphite particles are needle-like graphite particles.

(6) A fuel cell separator as defined in any of (3) to (5) above, wherein the graphite particles are added in an amount of 200 to 900 pbw for 100 pbw of the thermosetting resin.

(7) A fuel cell separator, as defined in any of (3) to (6) above, having on one side or both sides thereof channels for gas supply and discharge formed from a compound composed mainly of thermosetting resin and graphite particles, characterized in having a flexural modulus of $M_1$ GPa and a flexural strength of $M_2$ MPa (both measured according to JIS K6911) which satisfy the following relations.

$$900 \leq M_1 \times M_2 \leq 2000$$

$$2 \leq M_2/M_1 \leq 10$$

(8) A fuel cell separator, as defined in any of (3) to (6) above, having on one side or both sides thereof channels for gas supply and discharge formed from a compound composed mainly of thermosetting resin and graphite particles, characterized in having a flexural modulus equal to or lower than 20 GPa and a flexural strength equal to or higher than 50 MPa (both measured according to JIS K6911).

(9) A fuel cell system of solid polymer type constructed of a number of unit cells, each consisting of an electrolytic membrane of solid polymer, a pair of electrodes holding above-mentioned membrane between them, and a pair of separators holding above-mentioned electrodes between them in such a way as to form channels for gas supply and discharge, characterized in that the fuel cell separator defined in any of (1) to (8) above is used for part or all of the separators in above-mentioned fuel cell system.

BRIEF DESCRIPTION OF THE DRAWINGS

FIG. 2A depicts the one which has channels for gas supply and discharge on both sides thereof. FIG. 2B depicts the one which has channels for gas supply and discharge on one side thereof.

FIG. 3 is a graph showing the relation between flexural strength and bending in Examples and Comparative Examples.

FIG. 4 is a graph showing the particle size distribution of graphite particles in Examples and Comparative Examples.

DESCRIPTION OF THE PREFERRED EMBODIMENTS

Figure 1:
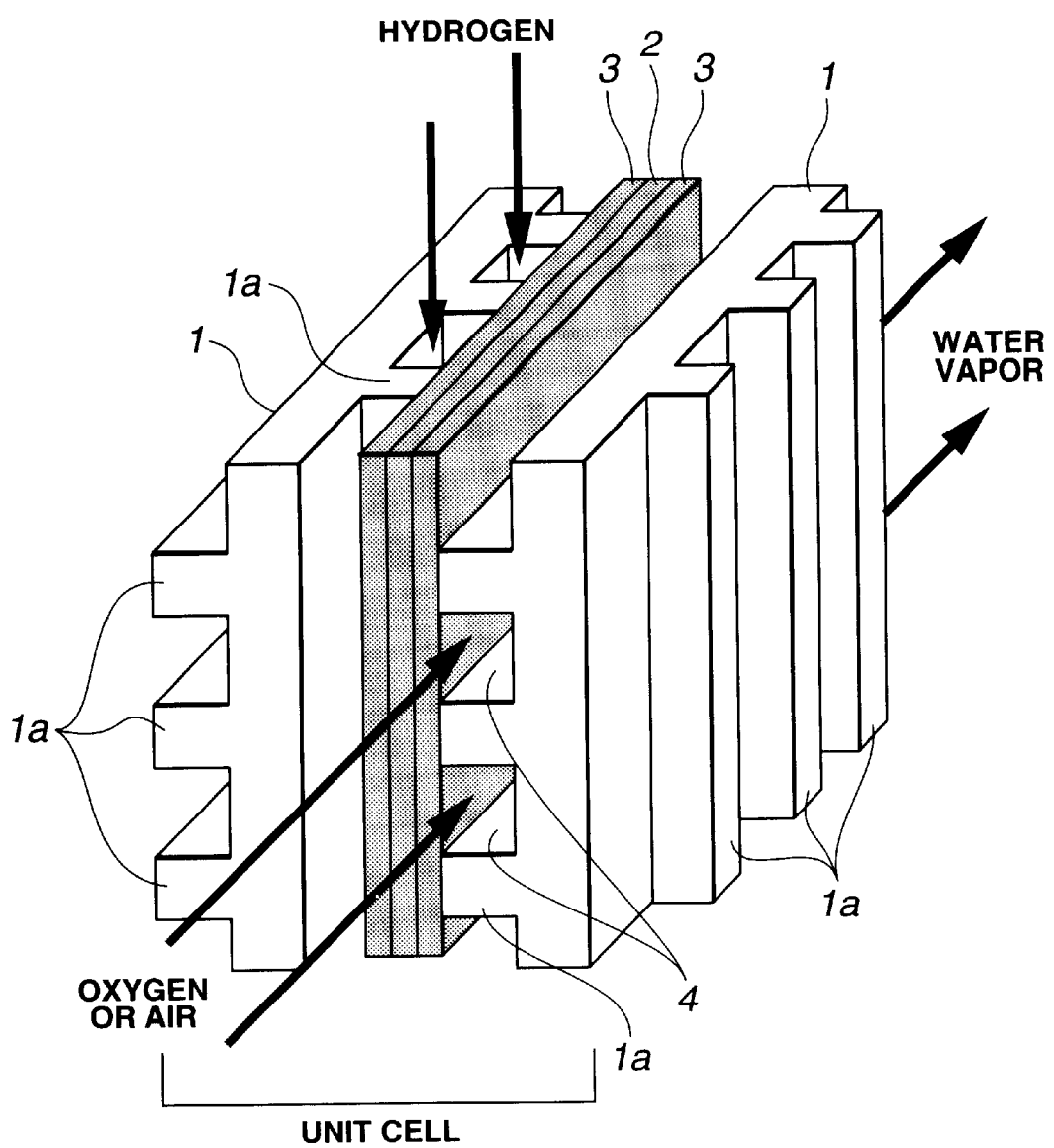
FIG. 1 is a perspective view showing one example of the fuel cell.

The invention will be described in more detail in the following.

According to the present invention, the fuel cell separator has a flexural modulus of $M_1$ GPa and a flexural strength of M2 MPa (both measured according to JIS K6911 [General test method for thermosetting plastics] which satisfy the following relations.

$$900 \leq M_1 \times M_2 \leq 2000$$

$$2 \leq M_2/M_1 \leq 10$$

With a high flexural strength and a rather low flexural modulus, the fuel cell separator has remarkably high flexibility.

The relation between flexural modulus ($M_1$ GPa) and flexural strength ($M_2$ MPa) should be $900 \leq M_1 \times M_2 \leq 2000$, preferably $1000 \leq M_1 \times M_2 \leq 1900$, and more preferably $1100 \leq M_1 \times M_2 \leq 1800$.

The relation between flexural modulus ($M_1$ GPa) and flexural strength ($M_2$ MPa) should also be $2 \leq M_2/M_1 \leq 10$, preferably $2.3 \leq M_2/M_1 \leq 8$, and more preferably $3 \leq M_2/M_1 \leq 6$.

The fuel cell separator should have a flexural modulus equal to or lower than 20 GPa, preferably 4 to 20 GPa, more preferably 10 to 20 GPa, and most desirably 15 to 20 GPa, measured according to JIS K6911 [General test method for thermosetting plastics]. In addition, the fuel cell separator should have a flexural strength equal to or higher than 50 MPa, preferably equal to or higher than 55 MPa, more preferably 60 to 100 MPa, and most desirably 60 to 80 MPa, measured according to JIS K6911. Incidentally, the amount of distortion should be larger than 0.9 mm, preferably larger than 1.0 mm, and more preferably 1.1 to 2.0 mm.

With a flexural modulus and a flexural strength outside the range specified above or not satisfying the relations defined above, the fuel cell separator is strong but brittle and hence it is liable to break at the time of fuel cell assembling or while the fuel cell is used as a mobile power source for automobiles, hybrid cars, and small ships.

The fuel cell separator according to the present invention is formed from a compound composed mainly of (A) thermosetting resin and (B) graphite particles. The kind and amount of components (A) and (B) are not specifically restricted, and they may be selected so as to achieve the flexural modulus and flexural strength in the range specified above. Selection of graphite particles as component (B) is important. It is desirable to use graphite particles having an average particle diameter of 20 to 100 μm and a maximum particle diameter of 240 to 550 μm so that the resulting fuel cell separator meets the above-mentioned requirements.

Graphite particles as component (B) are not specifically restricted so long as they meet the above-mentioned requirement for average particle diameter and maximum particle diameter. It is possible to use either natural graphite or artificial graphite. The average particle diameter should be 25 to 80 μm, preferably 30 to 60 μm. The maximum particle diameter should be 300 to 500 μm, preferably 350 to 500 μm. With graphite particles having an average particle diameter and a maximum particle diameter outside the above-mentioned range, the resulting fuel cell separator is so poor in flexibility that it cracks at the time of fuel cell assembling or it decreases in gas impermeability intended in the present invention.

The graphite particles should desirably be needle-like ones rather than lamellar, bulky, flaky, or spherical ones. Broad needle-like particles are more desirable than sharp needle-like particles.

According to the present invention, graphite particles as component (B) should have the properties specified above. They should have a broad particle size distribution (difference between the maximum particle size and the minimum particle size), with particles of large diameter dominating. The particle size distribution should be as follows.

| Particle diameter (d) | Ratio |
| --- | --- |
| d < 10 μm | 5 to 20 wt % (preferably 10 to 20%) |
| 10 ≦ d < 50 μm | 15 to 75 wt % (preferably 20 to 65%) |
| 50 ≦ d < 100 μm | 15 to 60 wt % (preferably 15 to 40%) |
| 100 ≦ d < 200 μm | 5 to 25 wt % (preferably 5 to 15%) |
| d ≧ 200 μm | remainder |

Graphite particles as component (B) should be added in an amount of 200 to 900 pbw, preferably 250 to 700 pbw, more preferably 300 to 600 pbw, for 100 pbw of thermosetting resin as component (A). With graphite particles in an amount less than specified above, the resulting fuel cell separator has a high resistance and is poor in conductivity. With graphite particles in an amount more than specified above, the resulting compound (or a mixture of thermosetting resin and graphite) is poor in fluidity at the time of molding.

The thermosetting resin as component (A) is not specifically restricted. It includes phenolic resins of resol type or novolak type, furan resins (such as furfuryl alcohol resin, furfuryl alcohol-furfural resin, and furfuryl alcohol-phenol resin), polyimide resin, polycarbodiimide resin, polyacrylonitrile resin, pyrene-phenanthrene resin, polyvinyl chloride resin, epoxy resin, urea resin, diallyl phthalate resin, unsaturated polyester resin, and melamine resin. They may be used alone or in combination with one another. Of these resins, phenolic resin and epoxy resin and their mixture are desirable.

The compound for the fuel cell separator of the present invention may be incorporated with optional additives in addition to the above-mentioned components (A) and (B). Such additives include fibrous base material, mold release agent, metal powder, and hydrolysis preventing agent, which will improve strength, releasability, hydrolysis resistance, and conductivity.

The fibrous base material includes, for example, inorganic fibers, such as metal fiber (of iron, copper, brass, bronze, and aluminum), ceramics fiber, potassium titanate fiber, glass fiber, carbon fiber, rock wool, wollastonite, sepiolite, attapulgite, artificial mineral fiber and organic fibers such as aramide fiber, polyimide fiber, polyamide fiber, phenolic fiber, cellulose, and acrylic fiber. They may be used alone or in combination with one another. The fibrous base material should be used in an amount of 0 to 10 pbw for 100 pbw of the thermosetting resin as component (A).

The release agent is not specifically restricted. It includes silicone release agent, fluorine-based release agent, metallic soap release agent, amide release agent, and wax release agent. Preferable among them are internal release agents such as carnauba wax, stearic acid, and montanic acid. The amount of the release agent should be 0 to 3 pbw for 100 pbw of the thermosetting resin as component (A).

The above-mentioned metal powder includes those of stainless steel, gold, silver, copper, platinum, titanium, aluminum, and nickel. The metal powder should have an average diameter of 5 to 30 μm.

The fuel cell separator of the present invention may be produced in two stages. In the first stage, a thermosetting resin as component (A) and graphite particles as component (B) are uniformly mixed together to give a molding compound. In the second stage, the molding compound undergo compression molding, injection molding, or transfer molding.

Compression molding, injection molding, or transfer molding may be carried out in the usual way under the normally employed conditions. For example, in the case where phenolic resin is used as the thermosetting resin as component (A), the molding compound is placed in a mold for the fuel cell separator of prescribed configuration and then molded at 150 to 160° C. and 10 to 50 MPa for 5 to 10 minutes. The molded product is post-heated at 130 to 200° C. for 0 to 72 hours. In this way there is obtained the desired fuel cell separator.

The above-mentioned compression molding, injection molding, and transfer molding are not the only way to produce the fuel cell separator of the present invention; it is also possible to utilize common injection-compression molding, hydrostatic molding, belt pressing, and roll molding, alone or in combination with one another.

The fuel cell separator of the present invention should have an $N_2$ gas permeability (at 23° C.) no equal to or higher than 20 $cm^3/m^2 \cdot 24$ hr·atm, preferably no equal to or higher than 10 $cm^3/m^2 \cdot 24$ hr·atm, and more preferably no equal to or higher than 5 $cm^3/m^2 \cdot 24$ hr·atm. The permeability is measured according to JIS K7126 [Method for evaluating the gas permeability of plastics films], Method B (isobaric method), with a specimen, 2 mm thick and 100 mm in diameter, prepared from the molding compound for the fuel cell separator. With an excessively high degree of gas permeability, the fuel cell separator causes gas leakage, with the result that the object and effect of the present invention are not achieved.

The fuel cell separator thus obtained should have a specific resistance no equal to or higher than 200 mΩ·cm, preferably no equal to or higher than 50 mΩ·cm, and more preferably 2 to 30 mΩ·cm. The specific resistance is measured according to JIS H0602 which specifies the four-probe method used to measure the resistivity of silicon single crystals and wafers.

The fuel cell system of solid polymer type according to the present invention is constructed of a number of unit cells, each consisting of a pair of electrodes holding a solid high polymer electrolytic membrane between them and a pair of separators holding the electrodes between them and forming passages for gas supply and discharge. The unit cell is characterized in that its separator is the fuel cell separator pertaining to the present invention.

The fuel cell system is constructed of tens of unit cells which are stacked to form the battery module. As shown in FIG. 1, each unit cell consists of one electrolytic membrane of solid polymer 2, two gas diffusion electrodes of carbon paper 3, 3, and two separators 1, 1, each having ribs 1a which form channels 4 for gas (such as hydrogen and oxygen) to be supplied and discharged.

According to the present invention, the fuel cell system is characterized in that its separators are entirely or partly the fuel cell separators specified as above. To be concrete, it is desirable that the number of the fuel cell separators of the present invention accounts for no less than 50%, preferably 50 to 100%, more preferably 70 to 100%, most desirably 80 to 100%, of the total number of fuel cell separators. If this ratio is small, the resulting fuel cell system is poor in vibration and shock resistance and hence it is impossible to achieve the object and effect of the present invention. The fuel cell separator of the present invention may be supplemented with ordinary fuel cell separators.

The solid polymer electrolytic membrane mentioned above may be an ordinary one which is commonly used for fuel cells of solid polymer type. For example, it may be polytrifluorostyrenesulfonic acid or perfluorocarbonsulfonic acid (trade name: Nafion), which is a proton-conductive ion-exchange membrane formed from fluoroplastics. This electrolytic membrane has its surface coated with a paste of carbon powder (supporting platinum or platinum alloy as a catalyst) dispersed in an organic solvent, such as a mixture of water and lower fatty alcohol containing perfluorocarbonsulfonic acid. (This mixture is designated as Nafion 117 solution.)

The paired electrodes holding the solid high polymer electrolytic membrane between them may be formed from carbon paper, carbon felt, or carbon cloth woven from carbon fiber.

The electrolytic membranes and electrodes are integrally formed by pressing with heating at 120 to 130° C., with the former interposed between the latter. The same result may be obtained by bonding with an adhesive.

The integrated electrolytic membranes and electrodes are subsequently combined with a pair of separators in such a way that the separator forms passages for fuel gas to be supplied and discharged. In this way there is obtained a unit cell. This procedure is accomplished by applying an adhesive to the rib of the separator which comes into contact with the electrode.

According to the present invention, the fuel cell system of solid polymer type is characterized in that all or part (preferably no less than 50%) of its separators are the fuel cell separators defined above. Therefore, the fuel cell system of the present invention has good sealability and good vibration and shock resistance. It is suitable for use as a mobile power source for automobiles, hybrid cars, and small ships.

The fuel cell system of the present invention will also find use in various applications, such as small-scale local power generation, domestic power generation, simple power source at camping sites, power source for artificial satellites and space development.

The fuel cell separator of the present invention is a good elastic body having a high flexural strength and a low flexural modulus. Therefore, it ensures good surface contact for conduction even though it has a poor surface accuracy or it comes into contact with a structural member which has a poor surface accuracy. It absorbs the distortion in the stack. It permits the entire thickness of the fuel cell system to be adjusted by tightening at the time of assembling even though it varies in thickness accuracy and it warps. Thus it facilitates the assembling of fuel cell systems of high polymer type having high performance and high precision.

The fuel cell system of solid polymer type constructed entirely or partly with the fuel cell separator of the present invention has high gas sealability and good vibration and shock resistance. Because of its ability to absorb shocks and vibrations, it is suitable for use as a mobile power source for automobiles, hybrid cars, and small ships.

EXAMPLES

In what follows, the invention will be described in more detail with reference to examples and comparative examples, which are not intended to restrict the scope thereof.

Example 1

A compound was prepared by mixing in a kneader from 19 pbw of novolak-type phenolic resin and 81 pbw of needle-like graphite particles (broad) having an average particle diameter of 30 μm and a maximum particle diameter of 430 μm, as shown in Table 1. The resulting compound was made into a test piece, measuring 100×10×4 mm, by compression molding at 150° C. and 19.6 MPa for 5 minutes. The graphite particles have the particle size distribution shown below and in FIG. 4.

| Particle diameter (d) | Ratio |
| --- | --- |
| d < 10 μm | 13.4 wt % |
| 10 ≤ d < 50 μm | 52.6 wt % |
| 50 ≤ d < 100 μm | 24.0 wt % |
| 100 ≤ d < 200 μm | 8.5 wt % |
| d ≥ 200 μm | 1.5 wt % |

The test piece was examined for flexural strength, flexural modulus, and distortion according to JIS K6911 [General test method for thermosetting plastics], with a support distance being 80 mm. It was also examined for specific resistance according to JIS H0602 which specifies the four-probe method used to measure the resistivity of silicon single crystals and wafers.

Figure 2A:
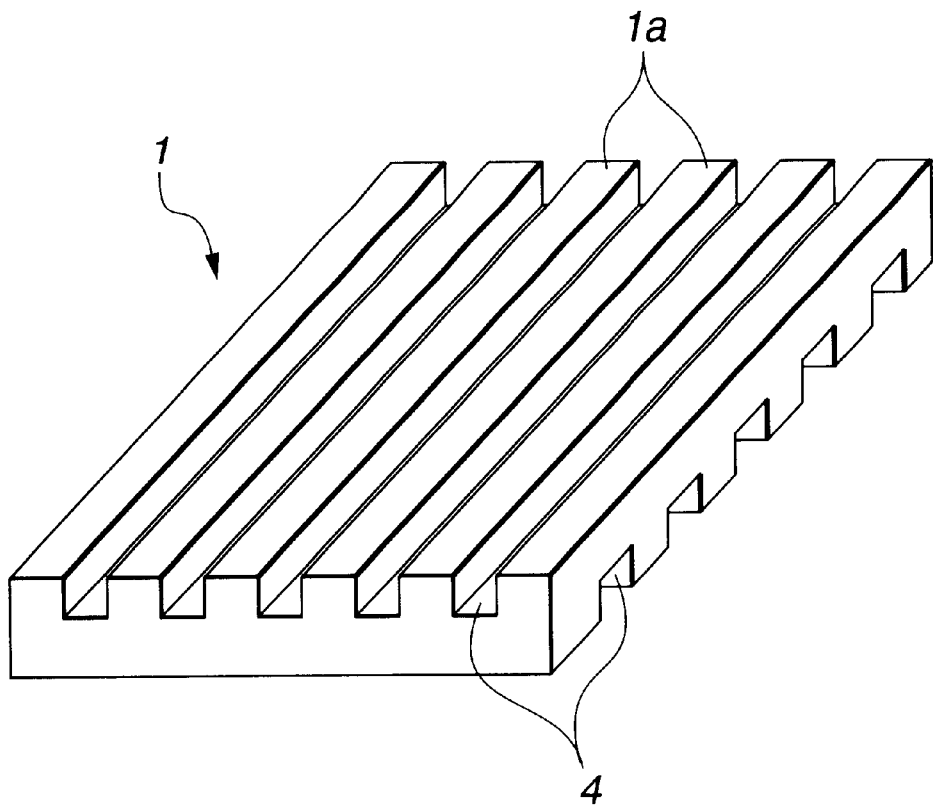
FIGS. 2A and 2B are perspective views of the fuel cell separator pertaining to one example of the present invention.
Figure 2B:
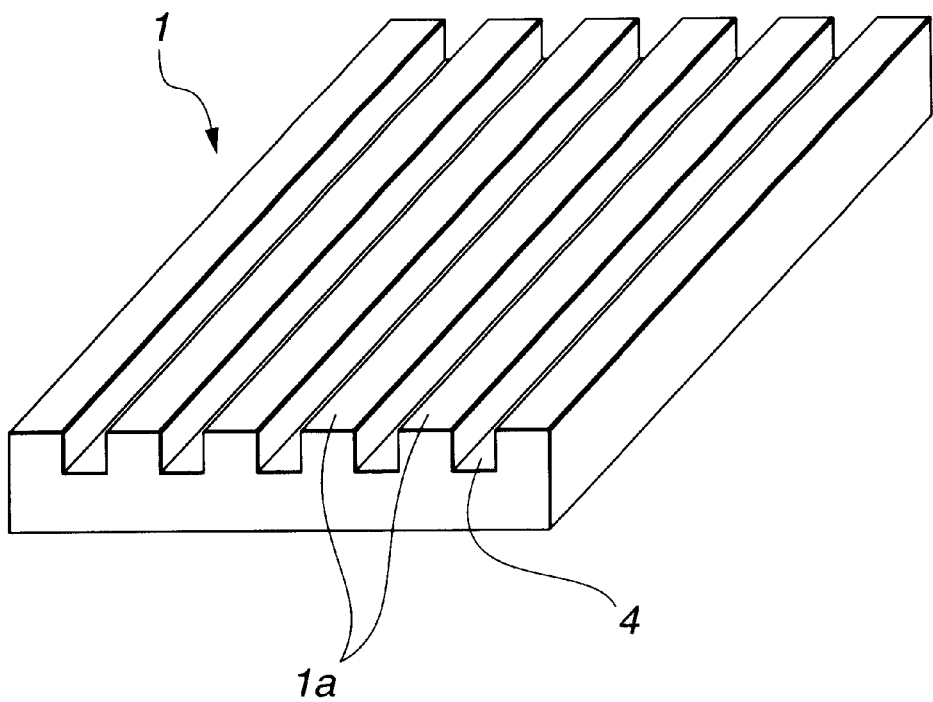

The compound was placed in a mold for the fuel cell separator which has on one side or both sides thereof channels 4 for gas supply and discharge as shown in FIGS. 2(A) and 2(B). Compression molding was carried out at 150° C. and 19.6 MPa for 5 minutes. Thus there was obtained a fuel cell separator measuring 400 mm long, 230 mm wide, and 2.3 mm thick. The fuel cell separator was examined for its performance in the following manner. The results are shown n Table 2.

Flexibility (Elasticity)

Evaluated according to bending that occurs when the specimen, with its both ends fixed, receives a static load at its center. Rating is indicated by three marks.

○: deflected

Δ: slightly deflected

×: not deflected

Stability in Assembling Step

Evaluated by observing whether or not cracking (due to tightening) occurred in 200 samples of the fuel cell separators during the assembling of a fuel cell system. Rating is indicated by three marks.

○: none cracked

Δ: some cracked

×: many cracked

Gas Permeability

Evaluated by measuring the $N_2$ gas permeability ($cm^3$/$m^2$·24 hr·atm) of a test piece (2 mm thick and 100 mm in diameter) of the fuel cell separator at 23° C. according to JIS K7126 [Method for evaluating the gas permeability of plastics films], Method B (isobaric method). Rating is indicated by three marks.

○: equal to or lower than 20

Δ: 20 to $10^3$

×: more than $10^3$

Example 2

A test piece was prepared in the same way as in Example 1, except that the novolak-type phenolic resin was replaced by a resol-type one. The test piece was examined for physical properties. The results are shown in Table 2 and FIG. 3. The graphite particles have the particle size distribution as shown in FIG. 4, which is identical with that in Example 1. The compound was made into a fuel cell separator in the same way as in Example 1, and the fuel cell separator was evaluated in the same way as in Example 1. The results are shown in Table 2.

Comparative Example 1

A test piece for comparison was prepared in the same way as in Example 1, except that the needle-like graphite particles were replaced by flaky graphite particles having an average particle diameter of 30 μm and a maximum diameter of 170 μm. The graphite particles have the particle size distribution as shown below and in FIG. 4.

| Particle diameter (d) | Ratio |
| --- | --- |
| d < 10 μm | 8.4 wt % |
| 10 ≤ d < 50 μm | 62.9 wt % |
| 50 ≤ d < 100 μm | 24.7 wt % |
| 100 ≤ d < 200 μm | 4.0 wt % |

The test piece was examined for physical properties. The results are shown in Table 2 and FIG. 3. The compound was made into a fuel cell separator in the same way as in Example 1, and the fuel cell separator was evaluated in the same way as in Example 1. The results are shown in Table 2.

Comparative Example 2

A test piece for comparison was prepared in the same way as in Example 1, except that the needle-like graphite particles were replaced by flaky graphite particles having an average particle diameter of 55 μm and a maximum particle diameter of 350 μm. The graphite particles have the particle size distribution as shown below and in FIG. 4.

| Particle diameter (d) | Ratio |
| --- | --- |
| d < 10 μm | 2.2 wt % |
| 10 ≤ d < 50 μm | 40.6 wt % |
| 50 ≤ d < 100 μm | 30.1 wt % |
| 100 ≤ d < 200 μm | 22.4 wt % |
| d ≥ 200 μm | 4.7 wt % |

The test piece was examined for physical properties. The results are shown in Table 2 and FIG. 3. The compound was made into a fuel cell separator in the same way as in Example 1, and the fuel cell separator was evaluated in the same way as in Example 1. The results are shown in Table 2.

Comparative Example 3

A test piece for comparison was prepared in the same way as in Example 1, except that the needle-like graphite particles were replaced by needle-like graphite particles (sharp) having an average particle diameter of 30 μm and a maximum particle diameter of 230 μm. The graphite particles have the particle size distribution as shown below and in FIG. 4.

| Particle diameter (d) | Ratio |
| --- | --- |
| d < 10 μm | 6.0 wt % |
| 10 ≤ d < 50 μm | 64.0 wt % |
| 50 ≤ d < 100 μm | 26.7 wt % |
| 100 ≤ d < 200 μm | 3.0 wt % |
| d ≥ 200 μm | 0.3 wt % |

The test piece was examined for physical properties. The results are shown in Table 2 and FIG. 3. The compound was made into a fuel cell separator in the same way as in Example 1, and the fuel cell separator was evaluated in the same way as in Example 1. The results are shown in Table 2.

TABLE 1

| | Thermosetting resin (pbw) | | Graphite particles | | | |
| --- | --- | --- | --- | --- | --- | --- |
| | Novolak-type phenolic resin | Resol-type phenolic resin | Average particle diameter (μm) | Maximum particle diameter (μm) | Shape | Amount added (pbw) |
| Example 1 | 19 | — | 30 | 430 | Needle-like (broad) | 81 |
| Example 2 | — | 19 | 30 | 430 | Needle-like (broad) | 81 |
| Comparative Example 1 | 19 | — | 30 | 170 | Flaky | 81 |
| Comparative Example 2 | — | 19 | 55 | 350 | Flaky | 81 |
| Comparative Example 3 | 19 | — | 30 | 230 | Needle-like (sharp) | 81 |

TABLE 2

| | Example 1 | Example 2 | Comparative Example 1 | Comparative Example 2 | Comparative Example 3 |
| --- | --- | --- | --- | --- | --- |
| Flexural modulus $M_1$ (GPa) | 17.1 | 17.3 | 38.3 | 31.0 | 19.7 |
| Flexural strength $M_2$ (MPa) | 57 | 66 | 51 | 30 | 42 |
| $M_1 \times M_2$ | 974.7 | 1141.8 | 1953.3 | 930 | 827.4 |
| $M_2/M_1$ | 3.3 | 3.8 | 1.3 | 0.97 | 2.13 |
| Bending (mm) | 1.10 | 1.45 | 0.63 | 0.45 | 0.82 |
| Resistivity (m · cm) | 28 | 19 | 10 | 15 | 25 |
| Flexibility | ○ | ○ | x | x | x |
| Stability during assembling | ○ | ○ | x | x | x |
| Gas permeability | ○ | ○ | x | x | x |

It is noted from Tables 1 and 2 and FIGS. 3 and 4 that the fuel cell separators in Examples 1 and 2 are superior in flexibility and immune to cracking at the time of fuel cell assembling, because they are formed from a compound containing needle-like graphite particles with an average article diameter of 20 to 100 μm and a maximum particle diameter of 240 to 550 μm and they have a flexural modulus equal to or lower than 20 GPa and a flexural strength equal to or higher than 50 MPa.

Example 3

Fuel Cell of Solid Polymer Type (1)

An integrated electrode was prepared in the usual way by bonding a pair of electrodes (carbon paper from Chemix Co., Ltd.) to an electrolytic membrane of solid high polymer ("Nafion"). This integrated electrode was held between two pieces of the fuel cell separator prepared in Example 1. Thus there was obtained a unit cell having passages for fuel gas supply and discharge. A fuel cell system was constructed from 50 unit cells which are tied together with bolts and nuts.

The fuel cell system was capable of charging and discharging, functioning satisfactorily.

The fuel cell system was given 1000 cycles of vibrations and shocks (which would be encountered in actual operation). The fuel cell separator remained intact.

Example 4

Fuel Cell of Solid Polymer Type (2)

An integrated electrode was prepared in the usual way by bonding a pair of electrodes (carbon paper from Chemix Co., Ltd.) to an electrolytic membrane of solid high polymer ("Nafion"). This integrated electrode was held between two pieces of the fuel cell separator prepared in Example 2. Thus there was obtained a unit cell having channels for fuel gas supply and discharge. A fuel cell system was constructed from 100 unit cells which are tied together with bolts and nuts.

The fuel cell system was capable of charging and discharging, functioning satisfactorily.

The fuel cell system was given 1000 cycles of vibrations and shocks (which would be encountered in actual operation). The fuel cell separator remained intact.

Comparative Example 4

Fuel Cell of Solid Polymer Type (3)

An integrated electrode was prepared in the usual way by bonding a pair of electrodes (carbon paper from Chemix Co., Ltd.) to an electrolytic membrane of solid high polymer ("Nafion"). This integrated electrode was held between two pieces of the fuel cell separator prepared in Comparative Example 1. Thus there was obtained a unit cell having passages for fuel gas supply and discharge. A fuel cell system was constructed from 100 unit cells which are tied together with bolts and nuts.

The fuel cell system did not work normally because of gas leakage from many cracks in the fuel cell separator.

The fuel cell system was given 1000 cycles of vibrations and shocks (which would be encountered in actual operation). Many of the fuel cell separators were broken.

The same result as in Comparative Example 4 was obtained when fuel cell systems were constructed with the fuel cell separators in Comparative Examples 2 and 3.

What is claimed is:

1. A fuel cell separator having on one side or both sides thereof channels for gas supply and discharge, wherein said channels are formed from a compound composed mainly of thermosetting resin and graphite particles, characterized in having a flexural modulus of 4 to 20 GPa and a flexural strength equal to or greater than 50 MPa (both measured according to JIS K6911).

2. The fuel cell separator as defined in claim 1, wherein the flexural modulus is 15 to 20 GPa and the flexural strength is 60 to 80 MPa (both measured according to JIS K6911).

3. A fuel cell separator having on one side or both sides thereof channels for gas supply and discharge, wherein said channels are formed from a compound composed manly of thermosetting resin and graphite particles, characterized in that said graphite particles have the following particle size distribution:

| Particle diameter (d) | Ratio |
|---|---|
| d < 10 μm | 5 to 20 wt % |
| 10 ≤ d < 50 μm | 15 to 75 wt % |
| 50 ≤ d < 100 μm | 15 to 60 wt % |
| 100 ≤ d < 200 μm | 5 to 25 wt % |
| d ≥ 200 μm | remainder. |

4. The fuel cell separator as defined in claim 3, wherein the graphite particles are needle-like graphite particles.

5. The fuel cell separator as defined in claim 3, wherein the graphite particles are added in an amount of 200 to 900 pbw for 100 pbw of the thermosetting resin.

6. The fuel cell separator as defined in claim 3, characterized in having a flexural modulus of $M_1$ GPa and a flexural strength of $M_2$ MPa (both measured according to JIS K6911) which satisfy the following relations:

$$900 \leq M_1 \times M_2 \leq 2000$$

$$2 \leq M_2/M_1 \leq 10.$$

7. The fuel cell separator as defined in claim 3, characterized in having a flexural modulus of 4 to 20 GPa and a flexural strength equal to or greater than 50 MPa (both measured according to JIS K6911).

8. The fuel cell separator as defined in claim 3, wherein the particles have an average particle diameter of 20 to 100 μm and a maximum particle diameter of 240 to 550 μm.

9. The fuel cell separator as defined in claim 8, wherein the particles have an average particle diameter of 30 to 60 μm and a maximum particle diameter of 350 to 500 μm.

10. The fuel cell separator as defined in claim 1 or claim 3, wherein said composition incorporates an additive selected from the group consisting of fibrous base materials, mold release agents, metal powders, and hydrolysis preventing agents.

11. A solid polymer fuel cell system that incorporates a number of unit cells, each consisting of an electrolytic membrane of solid polymer, a pair of electrodes holding said membrane between them, and a pair of separators holding said electrodes between them in such a way as to form channels for gas supply and discharge, wherein part or all of the separators in said fuel cell system is or are the fuel cell separator(s) defined in any one of claims 1 or 3–7.

12. A solid polymer fuel cell system that incorporates a number of unit cells, each consisting of an electrolytic membrane of solid polymer, a pair of electrodes holding said membrane between them, and a pair of separators holding said electrodes between them in such a way as to form channels for gas supply and discharge, in which 50% or more of the separators incorporated therein are fuel cell separators as defined in any one of claims 1 or 3–7.

* * * * *